(12) United States Patent
Otsuka et al.

(10) Patent No.: US 8,776,831 B2
(45) Date of Patent: Jul. 15, 2014

(54) CHECK VALVE

(75) Inventors: Noriyki Otsuka, Wermelskirchen (DE);
Marcel Walder, Huckeswagen (DE);
Marek Raczko, Wuppertal (DE);
Alexander Freiburg, Sundern-Amecke (DE)

(73) Assignee: Magna Powertrain Hueckeswagen GmbH, Hueckeswagen (DE)

( * ) Notice: Subject to any disclaimer, the term of this patent is extended or adjusted under 35 U.S.C. 154(b) by 28 days.

(21) Appl. No.: 13/514,724

(22) PCT Filed: Nov. 23, 2010

(86) PCT No.: PCT/DE2010/001374
§ 371 (c)(1),
(2), (4) Date: Jun. 8, 2012

(87) PCT Pub. No.: WO2011/069477
PCT Pub. Date: Jun. 16, 2011

(65) Prior Publication Data
US 2012/0244019 A1    Sep. 27, 2012

(30) Foreign Application Priority Data
Dec. 9, 2009 (DE) .......... 10 2009 057 649

(51) Int. Cl.
*F16K 15/14* (2006.01)
(52) U.S. Cl.
USPC .................... 137/843; 137/512.15

(58) Field of Classification Search
CPC ...... F16K 15/14; F16K 15/141; F16K 15/148
USPC .................. 137/511, 843, 854, 512.15
See application file for complete search history.

(56) References Cited

U.S. PATENT DOCUMENTS

| | | | | |
|---|---|---|---|---|
| 1,867,478 | A | * 7/1932 | Stelzner | ............... 137/512.15 |
| 4,043,123 | A | * 8/1977 | Konishi et al. | ............... 60/397 |
| 4,204,555 | A | 5/1980 | Durling | |
| 4,360,326 | A | * 11/1982 | Buchholz et al. | ............... 418/97 |
| 4,711,224 | A | * 12/1987 | Eckhardt | ............... 123/572 |
| 5,704,522 | A | 1/1998 | Orgeolet et al. | |

FOREIGN PATENT DOCUMENTS

| | | |
|---|---|---|
| EP | 0732 301 | 9/1996 |
| FR | 1 001 055 | 2/1952 |
| GB | 2452139 | 2/2009 |

\* cited by examiner

*Primary Examiner* — Kevin Lee
*Assistant Examiner* — Phyllis M Nichols
(74) *Attorney, Agent, or Firm* — Davidson, Davidson & Kappel, LLC

(57) ABSTRACT

A check valve (10), including a valve membrane (12), which includes an umbrella-like closing body (14), which in a closed position abuts a housing body (5) in such a way that the closing body prevents the passage of a medium through passage holes (26) provided in the valve body (16), the closing body lifting off the housing body in an open position in order to allow a medium to pass through the passage holes. In the open position and/or closed position the closing element is clamped between the valve body and the housing body at least at one point (31, 32).

10 Claims, 4 Drawing Sheets

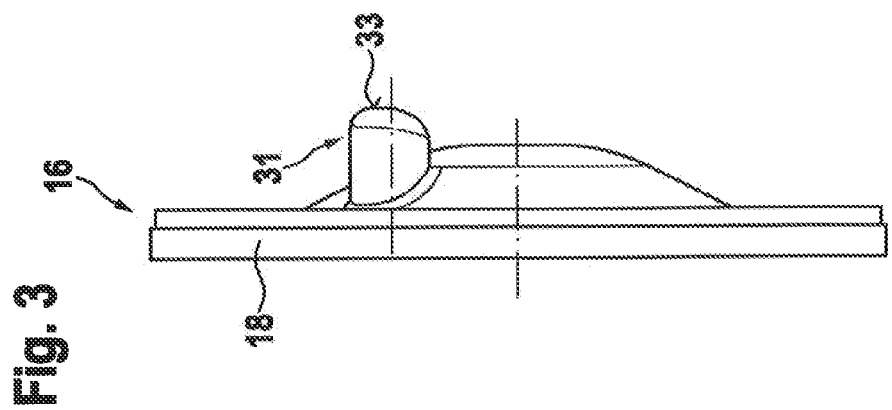
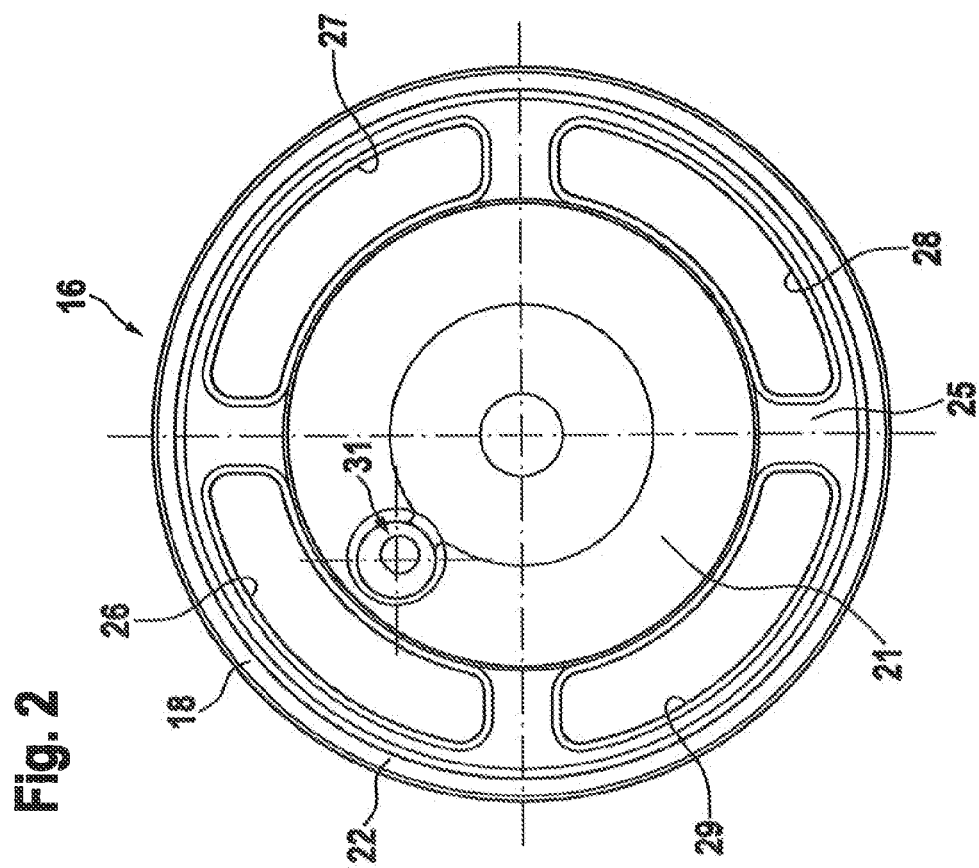

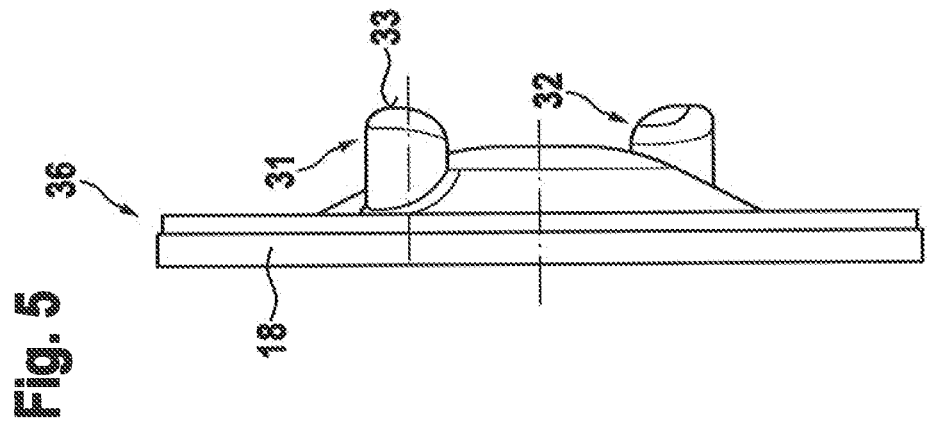
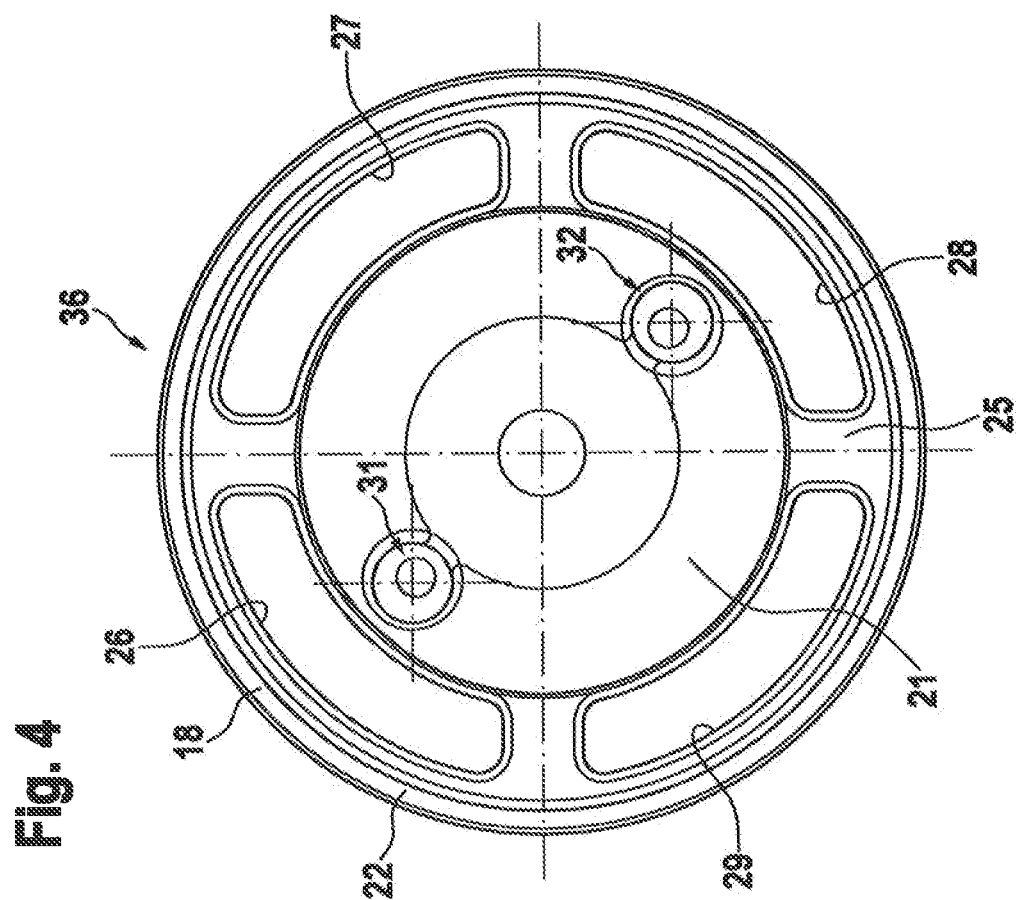

CHECK VALVE

The present invention relates to a check valve having a valve diaphragm which includes an umbrella-like closure member which, in a closed position, abuts against a housing body in such a way that the closure member prevents the passage of a medium through passage holes provided in the valve body, and which closure member, in an open position, lifts off the housing body in order to allow a medium to pass through the passage holes. The present invention further relates to a pump nozzle having such a check valve. In addition, the present invention relates to a vacuum pump, particularly one for creating negative pressure in a brake booster of a motor vehicle, which has such a pump nozzle.

SUMMARY OF THE INVENTION

It is an object of the present invention to provide an improved check valve having a valve diaphragm which includes an umbrella-like closure member which, in a closed position, abuts against a housing body in such a way that the closure member prevents the passage of a medium through passage holes provided in the valve body, and which closure member, in an open position, lifts off the housing body in order to allow a medium to pass through the passage holes; the check valve being improved in terms of unwanted generation of noise during its operation.

In a check valve having a valve diaphragm which includes an umbrella-like closure member which, in a closed position, abuts against a housing body in such a way that the closure member prevents the passage of a medium through passage holes provided in the valve body, and which closure member, in an open position, lifts off the housing body in order to allow a medium to pass through the passage holes, the aforementioned object is achieved in that in the open position and/or in the closed position, the closure member is clamped at least one point between the valve body and a housing body. The freedom of motion of the valve diaphragm is restricted in a specific way through defined fixation the closure body to the valve body. This makes it possible to significantly reduce, or even completely eliminate, unwanted generation of noise caused by the valve diaphragm during the operation of the check valve. Through defined clamping of the closure member it is possible to attenuate its vibration amplitude.

One preferred exemplary embodiment of the check valve is characterized in that in the open position and/or in the closed position, the closure member is clamped between the valve body and the housing body in such a way that it assumes an irregular shape in the circumferential direction when in the open position. The irregular shape in the circumferential direction results in a shift in the frequency of the noise produced by the closure member. Moreover, the irregular shape in the circumferential direction can also reduce the sound pressure level of the valve diaphragm. Since the closure member is clamped, it deforms differently during opening than without clamping. The closure member deforms irregularly, particularly in the circumferential direction.

Another preferred exemplary embodiment of the check valve is characterized in that in the open position and/or in the closed position, the closure member is clamped between the valve body and the housing body in such a way that the vibration amplitude of the closure member in the open position is, in particular, locally reduced. The resulting reduction in noise manifests itself in a reduction of the sound pressure level, a reduction of the amplitude and a shift in the frequency of the unwanted noise. The noise is mainly a whistling sound.

A further exemplary embodiment of the check valve is characterized in that the valve body has at least one clamping projection, which is formed with a clamping face for the closure member against which the closure member abuts both in its open position and in its closed position. The clamping projection may have substantially the shape of a right circular cylinder, whose free end is formed with a bevel to provide the clamping face. Alternatively, or in addition, the and/or an additional clamping projection may be formed on the closure member itself. Preferably, the closure member is clamped between the housing body and the valve body both in the open position and in the closed position.

Yet another preferred exemplary embodiment of the check valve is characterized in that the clamping projection is integrally connected to the valve body. Preferably, a plurality of clamping projections are disposed diametrically opposite on the valve body.

A further preferred exemplary embodiment of the check valve is characterized in that the valve body is injection-molded from plastic integrally with the clamping projection. Preferably, the valve body is integrated into a pump nozzle of a vacuum pump together with the closure member.

Another preferred exemplary embodiment of the check valve is characterized in that the valve body has an elongated slot radially outward from the clamping projection. The elongated slot allows the passage of a medium when the closure member is in the open position. Preferably, a plurality of elongated slots are distributed, in particular uniformly distributed, around a circumference of the valve body. However, not all of the elongated slots have a clamping projection associated therewith.

Yet another preferred exemplary embodiment of the check valve is characterized in that the elongated slot has the shape of a circular arc. Preferably, the clamping projection is disposed in the middle of the circular arc of the associated elongated slot, as viewed in the circumferential direction.

The present invention also relates to a pump nozzle having a check valve designed as described above. Preferably, the valve body is mounted in the pump nozzle together with the closure member. In order to facilitate mounting, the valve body may be mounted in the pump nozzle by means of a clip connection in such a way that the closure member is clamped between the valve body and the housing body as the valve body is clipped into the pump nozzle.

In addition, the present invention relates to a vacuum pump, particularly one for creating negative pressure in a brake booster of a motor vehicle, which has a pump nozzle designed as described above. The pump nozzle is mounted, preferably clipped, with the housing body into a corresponding opening of the vacuum pump. The housing body of the pump nozzle may also be screwed or pressed into a corresponding receiving opening of the vacuum pump.

BRIEF DESCRIPTION OF THE DRAWINGS

Further advantages, features and details of the present invention will be apparent from the following description in which various exemplary embodiments are explained in detail with reference to the drawing. In the drawing.

FIG. 2 is a front view showing a valve body of the check valve of FIG. 1;

FIG. 3 is a side view of the valve body of FIG. 2;

FIG. 4 is a front view showing a valve body similar to that of FIG. 2 in accordance with a second exemplary embodiment;

FIG. 5 is a side view of the valve body of FIG. 4; and

DETAILED DESCRIPTION

Figure 1:
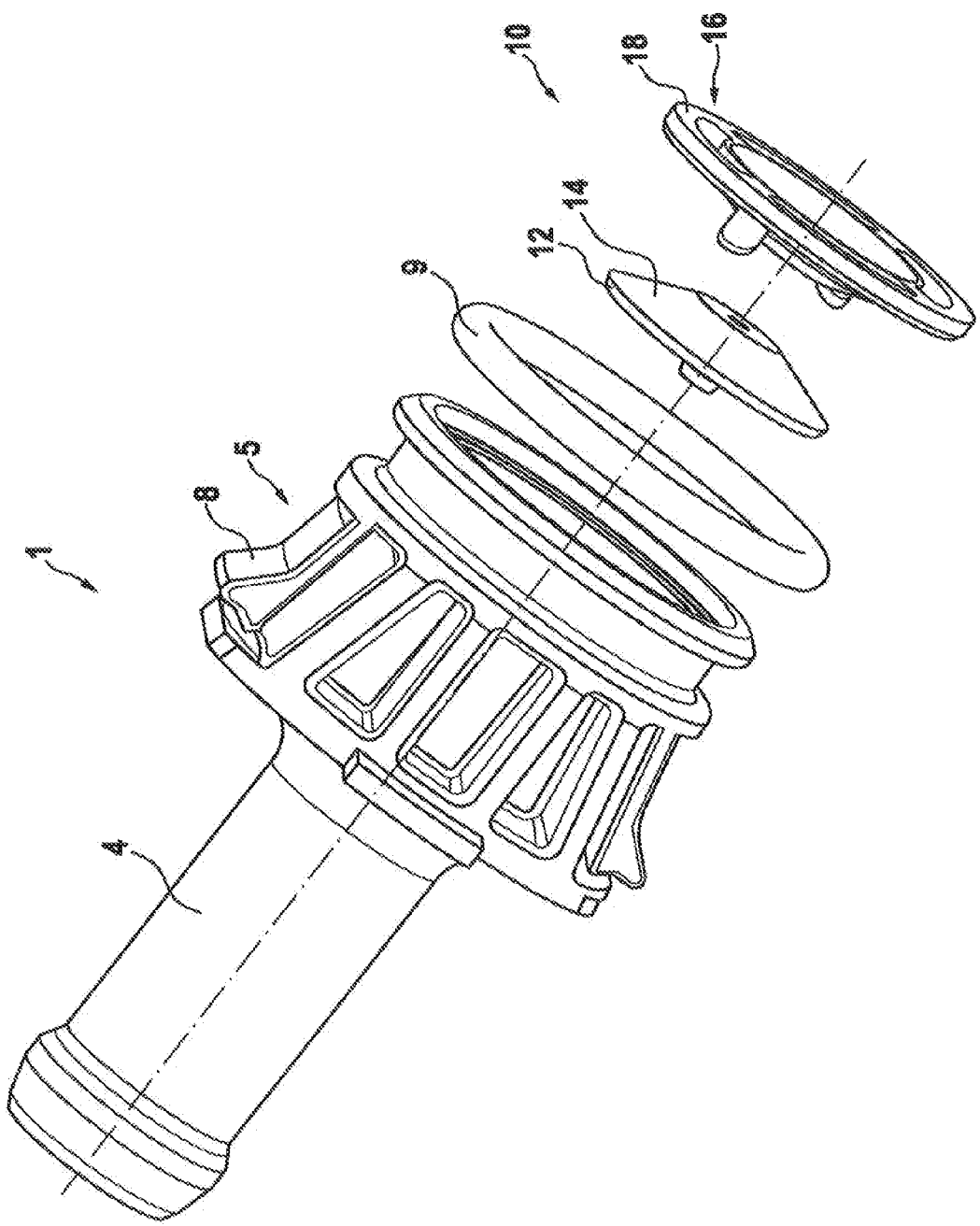
FIG. 1 is an exploded view of a pump nozzle having a check valve according to the present invention.
Figure 6:
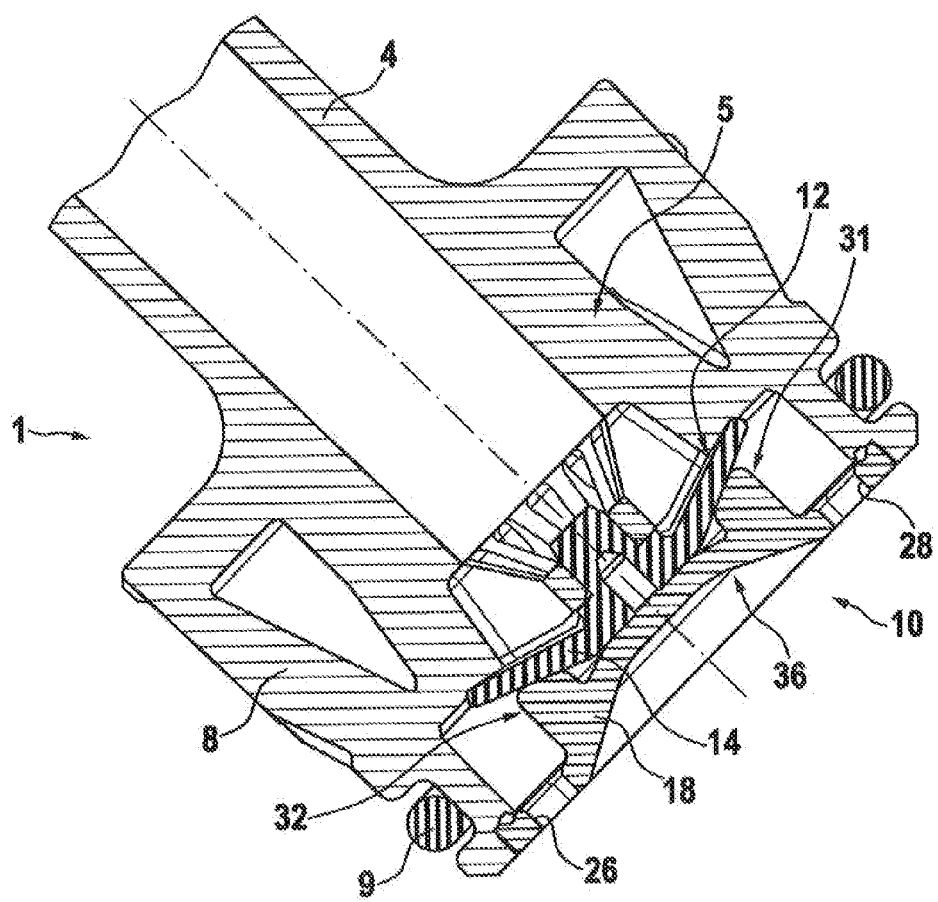
FIG. 6 is a longitudinal cross-sectional view of the pump nozzle of FIG. 1.

FIGS. 1 and 6 show different views of a pump nozzle 1. Pump nozzle 1 is part of a vacuum pump, which may be in the form of, for example, a vane-type pump. The vacuum pump pumps air through pump nozzle 1 out of a brake booster of the motor vehicle in order to create a vacuum or negative pressure in the brake booster. Therefore, the vacuum pump is also referred to as a negative pressure pump. Pump nozzle 1 is also designated as suction nozzle.

Pump nozzle 1 includes a tubular connecting body 4, which is integrally connected to a housing body 5. Housing body 5 serves to fix pump nozzle 1 in a corresponding opening of the vacuum pump. For this purpose, housing body 5 is preferably provided with a plurality of snap hooks 8, which allow pump nozzle 1 to be clipped with housing body 5 into the housing opening of the vacuum pump. An O-ring 9 is received in an annular groove of housing body 5 to provide a seal between housing body 5 and the housing opening of the vacuum pump.

Air drawn by the vacuum pump passes through connecting body 4 of pump nozzle 1 and a check valve 10 into the interior of the vacuum pump. Check valve 10 prevents the drawn-in air from returning through connecting body 4 into the brake booster. Check valve 10 includes a valve diaphragm 12, which constitutes a closure member 14. Closure member 14 cooperates with a valve body 16, which is designed as a valve cap 18.

In FIGS. 2 and 3, valve body 16 is shown by itself in two different views. Valve body 16 includes a valve cap 18 having an inner ring member 21 and an outer ring member 22. The two ring members 21 and 22 are integrally connected to each other by radially extending webs 25. Four circular-arc-shaped elongated slots 26, 27, 28, 29 are formed circumferentially between webs 25 and radially between the two ring members 21, 22. Elongated slots 26 through 29 allow the passage of a working medium, in particular air, which is drawn into the vacuum pump through pump nozzle 1.

FIG. 6 shows check valve 10 in the mounted position. In its closed position shown, closure member 14 is biased against housing body 5 by its shape and/or by valve body 16 in a manner preventing unwanted passage of the medium through connecting body 4 into the brake booster. When closure member 14 lifts off housing body 5 and assumes its open position, then a passage between connecting body 4 and the vacuum pump is cleared to allow further drawing of air from the brake booster into the vacuum pump.

Within the context of the present invention, it was found that valve diaphragm 12, which constitutes closure member 14 and is preferably formed from a resilient plastic material, is excited into vibrations in its open position and during drawing of air, said vibrations causing unwanted generation of noise at a certain vibration amplitude. Resonance noise generated in the brake booster as a result thereof can be particularly disturbing.

In order to attenuate the vibration amplitude of valve diaphragm 12, valve cap 18 has at least one clamping projection 31, 32, which serves to clamp closure member 14 between valve body 16 and housing body 5 both in its open position and in its closed position. This clamping of valve diaphragm 12 makes it possible to shift the disturbing noise frequency and to reduce the associated sound pressure level.

In FIG. 2, it can be seen that a clamping projection 31 is formed on inner ring member 21 radially inward from elongated slot 26. Clamping projection 31 has substantially the shape of a right circular cylinder, which is integrally connected to inner ring member 21 of valve cap 18. The free end of clamping projection 31 is formed with a clamping face 33 against which closure member 14 abuts both in its open position and in its closed position.

FIGS. 4 and 5 show a valve body 36 having two diametrically opposite clamping projections 31, 32. As in the preceding exemplary embodiment, clamping projection 31 is disposed radially inward from elongated slot 26 and approximately centrally with respect thereto. Analogously, clamping projection 32 is disposed radially inward from elongated slot 28 and in the middle thereof, as viewed in the circumferential direction. Clamping projection 31 or, respectively, the two clamping projections 31, 32, causes/cause valve diaphragm 12 to be clamped between valve cap 18 and housing body 5 both in its closed position and in its open position.

As a result of the clamping, valve diaphragm 12 is fixed at one point or, respectively, at two points, thereby restricting the freedom of motion of valve diaphragm 12. Clamping projection 31 or, respectively, the two clamping projections 31, 32, is/are disposed in such a way that valve diaphragm 12 assumes an irregular shape or form in the circumferential direction as it opens. As a result, the vibration amplitude of valve diaphragm 12 is, in particular, locally reduced in the region of fixation.

List Of Reference Numerals 1 pump nozzle
4 connecting body
5 housing body
8 snap hook
9 O-ring
10 check valve
12 valve diaphragm
14 closure member
16 valve body
18 valve cap
21 inner ring member
22 outer ring member
25 web
26 elongated slot
27 elongated slot
28 elongated slot
29 elongated slot
31 clamping projection
32 clamping projection
33 clamping face
36 valve body

What is claimed is:

1. A check valve comprising:
a valve body having passage holes; and
a valve diaphragm including an umbrella closure member, the closure member, in a closed position, abutting against a housing body so that the closure member prevents passage of a medium through the passage holes, the closure member, in an open position, lifting off the housing body to allow the medium to pass through the passage holes, the umbrella closure member including an angled portion extending away from the valve body radially outward to contact the housing body in the closed position,
the valve body including at least one clamping projection having a clamping face for contacting the angled portion of the closure member and holding the angled portion of the closure member against the housing body in the open position such that the angled portion of closure member is fixed at at least one point between the valve body and the housing body and the angled portion of closure member lifts only partially off the housing body in the open position.

2. The check valve as recited in claim 1 wherein in the open position, the closure member is clamped between the valve body and the housing body in such a way that it assumes an irregular shape in a circumferential direction when in the open position.

3. The check valve as recited in claim 1 wherein in the at least one of the open position and the closed position, the closure member is clamped between the valve body and the housing body in such a way that a vibration amplitude of the closure member in the open position is reduced.

4. The check valve as recited in claim 1 wherein the clamping projection is integrally connected to the valve body.

5. The check valve as recited in claim 1 wherein the valve body is injection-molded from plastic integrally with the clamping projection.

6. The check valve as recited in claim 1 wherein the valve body has an elongated slot radially outward from the clamping projection, the elongated slot defining one of the passage holes.

7. The check valve as recited in claim 6 wherein the elongated slot has the shape of a circular arc.

8. A pump nozzle comprising a check valve as recited in claim 1.

9. A vacuum pump comprising the pump nozzle as recited in claim 8.

10. A negative pressure vacuum pump in a brake booster of a motor vehicle, comprising the vacuum pump as recited in claim 9.

* * * * *